US006088164A

United States Patent [19]

Fukasawa

[11] Patent Number: 6,088,164

[45] **Date of Patent: *Jul. 11, 2000**

[54] IMAGE FORMING APPARATUS HAVING A LENS ARRAY

[75] Inventor: Motomu Fukasawa, Iruma, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/066,835

[22] Filed: Apr. 28, 1998

[30] Foreign Application Priority Data

May 13, 1997 [JP] Japan .................................... 9-137667

[51] Int. Cl.[7] .................................................... G02B 27/10

[52] U.S. Cl. ............................................ 359/619; 359/626

[58] Field of Search .................................... 359/619, 621, 359/622, 623, 624, 626

[56] References Cited

U.S. PATENT DOCUMENTS

| | | | |
|---|---|---|---|
| 4,751,553 | 6/1988 | Fukasawa | 355/45 |
| 4,794,427 | 12/1988 | Shirai et al. | 355/49 |
| 5,027,359 | 6/1991 | Leger et al. | 372/18 |
| 5,033,060 | 7/1991 | Leger et al. | 372/97 |
| 5,287,147 | 2/1994 | Fukasawa et al. | 355/233 |
| 5,321,429 | 6/1994 | Ono et al. | 346/107 R |
| 5,509,140 | 4/1996 | Koitabashi et al. | 347/86 |
| 5,517,359 | 5/1996 | Gelbart | 359/623 |
| 5,619,238 | 4/1997 | Higuma et al. | 347/86 |
| 5,745,153 | 4/1998 | Kessler et al. | 347/241 |
| 5,787,107 | 7/1998 | Leger et al. | 372/71 |
| 5,802,092 | 9/1998 | Endriz | 372/50 |
| 5,861,992 | 1/1999 | Gelbart | 359/619 |

FOREIGN PATENT DOCUMENTS

| | | |
|---|---|---|
| 0257798 | 2/1998 | European Pat. Off. . |
| 3241914 | 12/1984 | Germany . |
| 3704984 | 8/1988 | Germany . |
| 63-87242 | 4/1988 | Japan . |
| 2-522 | 5/1990 | Japan . |
| 63-05195 | 1/1994 | Japan . |
| 9611110 | 4/1996 | WIPO . |

OTHER PUBLICATIONS

Patent Abstracts of Japan, vol. 095, No. 002, Mar. 13, 1995.

*Primary Examiner*—Georgia Epps
*Assistant Examiner*—Ricky Mack
*Attorney, Agent, or Firm*—Fitzpatrick, Cella, Harper & Scinto

[57] ABSTRACT

An image forming apparatus which can obtain a high-quality image although the adjustment of alignment is easy or unnecessary is provided. In the apparatus, light beams emitted from light-source means, in which a plurality of light-emitting devices are arranged in a one-dimensional direction, are focused onto a surface of a recording medium by a lens array formed by arranging a plurality of condensing lenses in a scanning direction in two lines so as to staggerly and closely place lenses in one line on lenses in another line. When the radius of a field of view of a single condensing lens is represented by $X_0$, the diameter of the condensing lens is represented by D, and a degree of overlap is represented by $m=X_0/D$, the lens array is formed so as to satisfy the following condition:

$$1.85<m<2.00.$$

24 Claims, 4 Drawing Sheets

IMAGE FORMING APPARATUS HAVING A LENS ARRAY

BACKGROUND OF THE INVENTION

1. Field of the Invention

The present invention relates to an image forming apparatus. More particularly, the invention relates to an image forming apparatus, suitable for a printer head using LED's (light-emitting diodes) or an LCD (liquid-crystal display), a dot array printer or the like, in which, by using a high-quality lens array redundant in alignment in a sub-scanning direction so as to hardly generate nonuniformity in the amount of light to influence the picture quality even if alignment between an LED array and the lens array deviates in the sub-scanning direction by a predetermined amount, an high-quality image can be obtained although the adjustment of the alignment is easy or unnecessary.

2. Description of the Related Art

FIG. 1 is a schematic diagram illustrating a principal portion of a method for measuring and controlling nonuniformity in the amount of light in a lens array in an image forming apparatus using the lens array.

In FIG. 1, light-source means 51 comprises an LED array in which a plurality of LED's are arranged in a one-dimensional direction. A lens array (imaging means) 52 is provided by arranging a plurality of condensing lenses (rod lenses) in two lines in a scanning direction in a close-packed state. The close-packed state is a state in which lenses in one line are staggered and closely placed on lenses in another line. This lens array 52 is also named a "two-line lens array". Measuring means 53 comprises, for example, a photosensor. Output means 54 comprises, for example, a display, and displays an output signal (representing the amount of light) obtained by the photosensor 53.

In FIG. 1, the plurality of LED's constituting the LED array 51 are all lit. The amount of emission (emission pattern) of light beams from the plurality of LED's is sensed by performing scanning by the photosensor 53 via the two-line lens array 52. An output signal obtained at that time from the photosensor 53 is displayed on the display 54. Nonuniformity in terms of the amount of amplitude (nonuniformity in the amount of light) is obtained from the maximum value (MAX) and the minimum value (MIN) of the displayed data. Thus, nonuniformity is confirmed and controlled.

It is known, however, that tolerance of human visual characteristics for nonuniformity depends not only on the above-described amount of amplitude but also on a spatial frequency. That is, as shown in FIGS. 2(A) and 2(B), tolerance of human visual characteristics for nonuniformity differs depending on the spatial frequency for the same amount of amplitude (MAX−MIN).

The state of nonuniformity in the spatial frequency greatly changes if the alignment between the LED array 51 and the two-line lens array 52 in the sub-scanning direction (in directions indicated by a two-headed arrow A) deviates, so that the picture quality greatly changes depending on the adjustment of the alignment in the sub-scanning direction. Hence, conventionally, there is the problem that it is necessary to very precisely adjust the alignment of the lens array in order to suppress the generation of nonuniformity.

SUMMARY OF THE INVENTION

It is an object of the present invention to provide an image forming apparatus, suitable for a printer head, a dot array printer or the like, in which, by using a high-quality lens array redundant in alignment in a sub-scanning direction so as to hardly generate nonuniformity in the amount of light depending on the spatial frequency to influence the picture quality even if alignment between an LED array and the lens array deviates in the sub-scanning direction by a predetermined amount, a high-quality image can be obtained although the adjustment of the alignment is easy or unnecessary.

According to one aspect, the present invention which achieves the above-described object relates to an image forming apparatus including light-source means in which a plurality of light-emitting devices are arranged in a one-dimensional direction, a recording medium, and a lens array for focusing light beams emitted from the light-source means onto a surface of the recording medium. The lens array is formed by arranging a plurality of condensing lenses in a scanning direction in two lines so as to stagger and closely place lenses in one line on lenses in another line. When the radius of a field of view of a single condensing lens is represented by $X_0$, the diameter of the condensing lens is represented by D, and a degree of overlap is represented by $m=X_0/D$, the lens array is formed so as to satisfy the following condition:

$$1.85<m<2.00.$$

The lens array may comprise a refractive-index-distribution-type rod lens array. The light-source means may comprise a light-emitting-diode array.

According to another aspect, the present invention which achieves the above-described object relates to an image forming apparatus including light-source means in which a plurality of light-emitting devices are arranged in a one-dimensional direction, a recording medium, and a lens array for focusing light beams emitted from the light-source means onto a surface of the recording medium. The lens array is formed by arranging a plurality of condensing lenses in a scanning direction in two lines so as to staggerly and closely place lenses in one line on lenses in another line. When nonuniformity in efficiency when an amount of emission of light beams emitted from the plurality of light-emitting devices is transmitted to the recording medium is measured by performing scanning while shifting the lens array in a sub-scanning direction and is acquired as data, and nonuniformity in a spatial frequency f appearing when the acquired data is subjected to frequency decomposition is generated at $f=n/D$ ($n=1, 2, \ldots$, and D is the diameter of the condensing lens), the lens array is formed so that a power of nonuniformity at the lowest spatial frequency $f=1/D$ is smaller than a power of nonuniformity at spatial frequencies near the second lowest spatial frequency $f=2/D$ even if alignment between the light-source means and the lens array deviates in the sub-scanning direction by a predetermined amount.

The predetermined amount may be $\pm D/5$. The power of nonuniformity at the lowest spatial frequency $f=1/D$ may be equal to or less than 5% and equal to or more than 0% of an average amount of light converted to an amount of amplitude. When the diameter of field of view of a single condensing lens is represented by $X_0$, the diameter of the condensing lens is represented by D, and a degree of overlap is represented by $m=X_0/D$, the lens array may be formed so as to satisfy the following condition:

$$1.85<m<2.00.$$

The lens array may be a refractive-index-distribution-type rod lens array. The light-source means may comprise a light-emitting-diode array.

According to still another aspect, the present invention which achieves the above-described object relates to an image forming apparatus including light-source means in which a plurality of light-emitting devices are arranged in a one-dimensional direction, a recording medium, and a lens array for focusing light beams emitted from the light-source means onto a surface of the recording medium. The lens array is formed by arranging a plurality of condensing lenses in a one-dimensional direction. When the diameter of a field of view of a single condensing lens is represented by $X_0$, the diameter of the condensing lens is represented by D, and a degree of overlap is represented by $m=X_0/D$, the lens array may be formed so as to satisfy the following condition:

$$1.85<m<2.00.$$

The lens array may be a refractive-index-distribution-type rod lens array. The light-source means may comprise a light-emitting-diode array.

The foregoing and other objects, advantages and features of the present invention will become more apparent from the following description of the preferred embodiment taken in conjunction with the accompanying drawings.

DESCRIPTION OF THE PREFERRED EMBODIMENT

Figure 1:
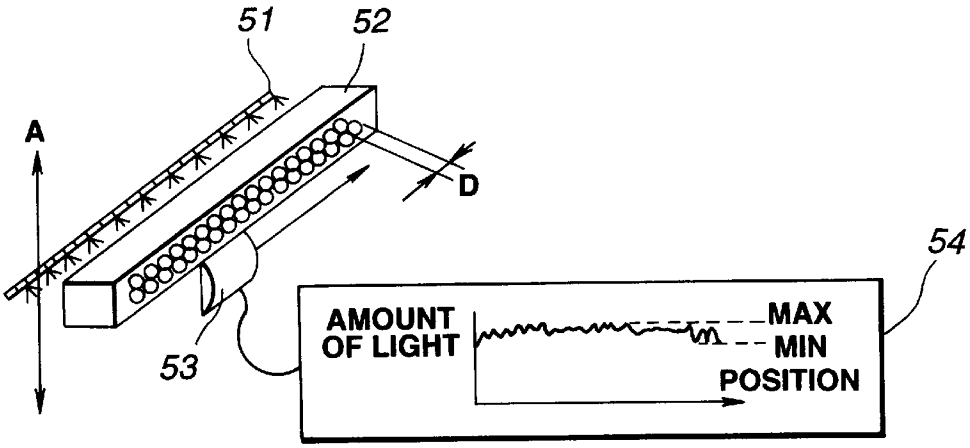
FIG. 1 is a schematic diagram illustrating a principal portion of a method for measuring nonuniformity in the amount of light of a lens array in an image forming apparatus.
Figure 2A:
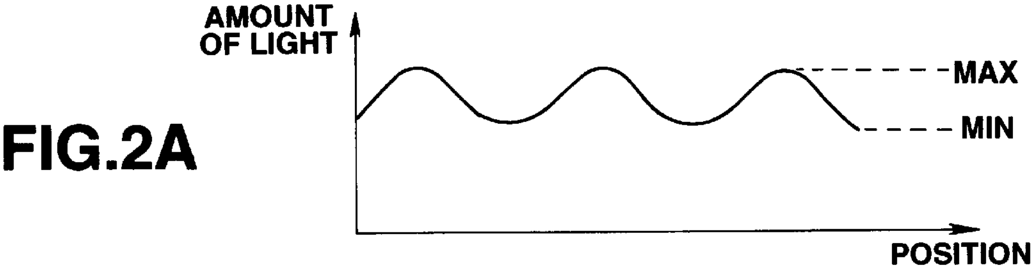
FIGS. 2(A) and 2(B) are graphs illustrating data of nonuniformity when the spatial frequency differs at the same amount of amplitude.
Figure 2B:
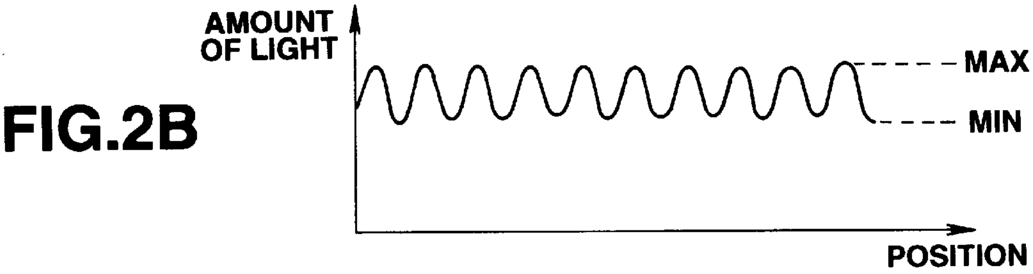
Figure 3:
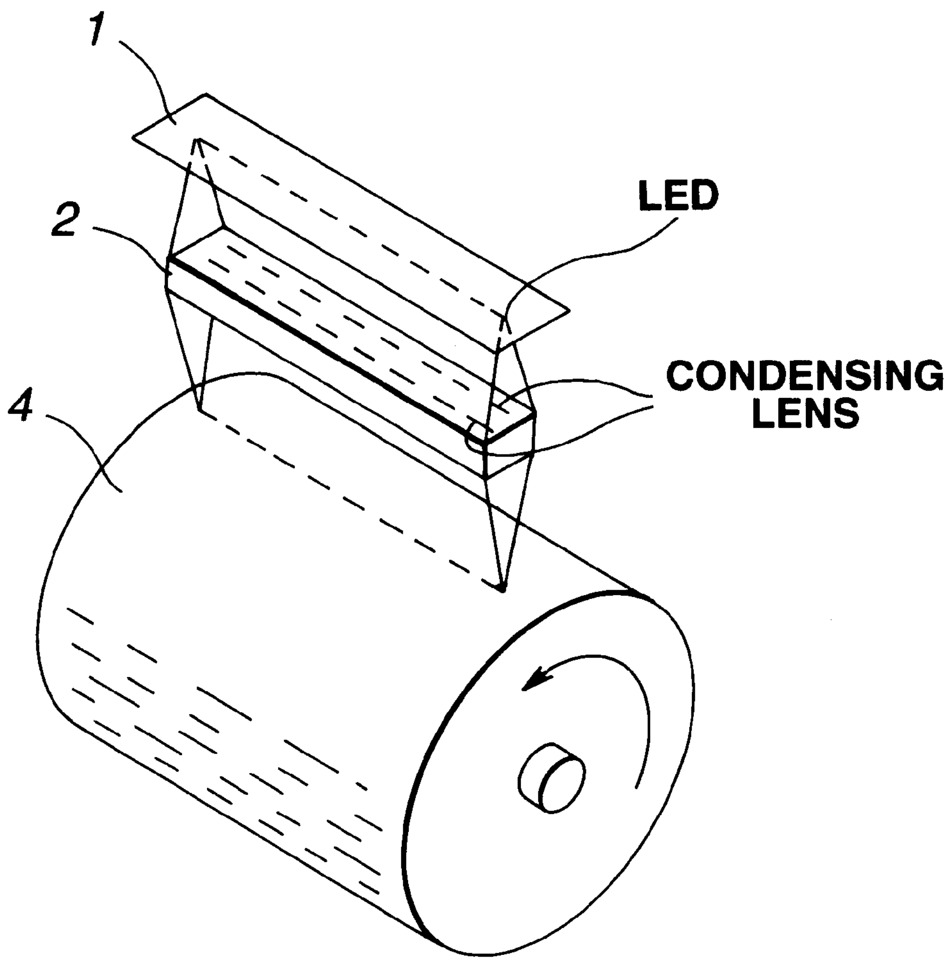
FIG. 3 is a diagram illustrating a principal portion of an image forming apparatus according to an embodiment of the present invention.
Figure 4:
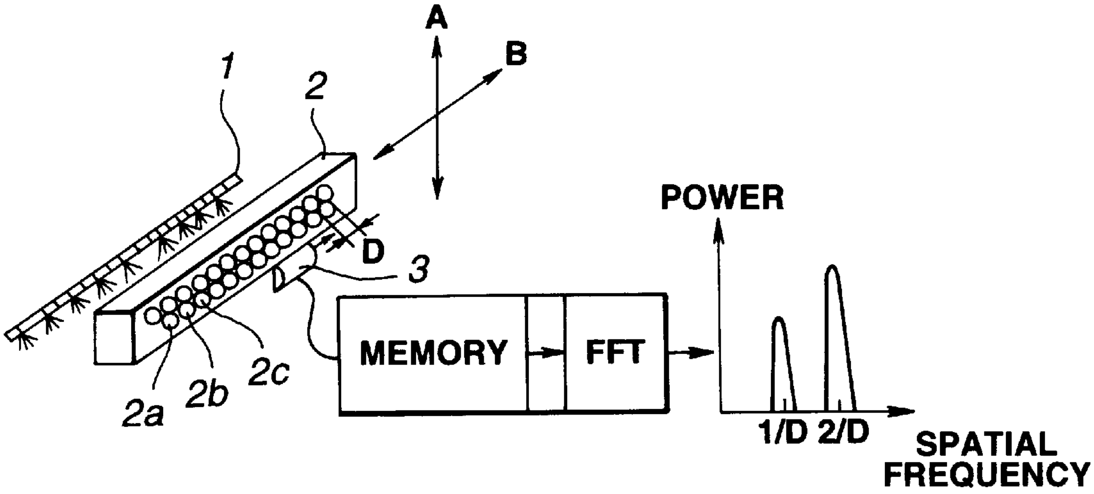
FIG. 4 is a schematic diagram illustrating a principal portion of a method for measuring nonuniformity in the amount of light of a lens array in the image forming apparatus shown in FIG. 3.
Figure 5:
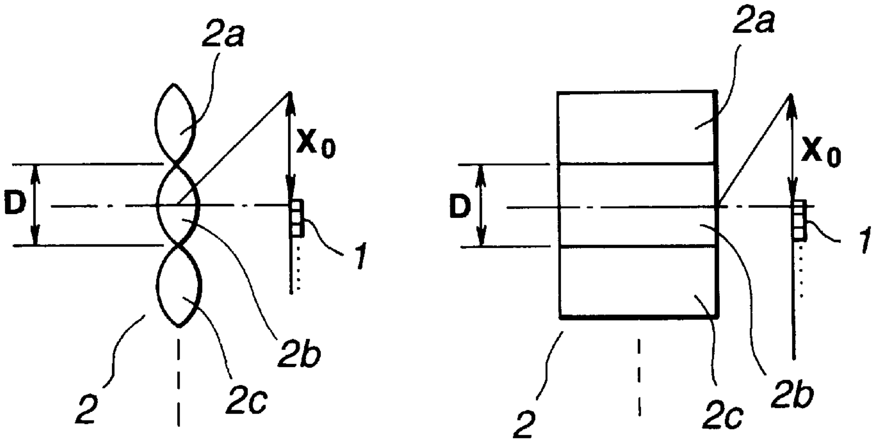
FIG. 5 is a diagram illustrating a degree of overlap of the lens array shown in FIG. 4.

FIG. 3 is a schematic diagram illustrating a principal portion of an image forming apparatus according to an embodiment of the present invention. FIG. 4 is a schematic diagram illustrating a principal portion of a method for measuring nonuniformity in the amount of light of a lens array in the image forming apparatus shown in FIG. 3. FIG. 5 is a diagram illustrating a degree of overlap of the lens array shown in FIG. 4.

In FIGS. 3 through 5, light-source means 1 comprises an LED array in which a plurality of LED's are deposed in a one-dimensional direction. A lens array (imaging means) 2 is formed by arranging a plurality of condensing lenses (rod lenses) 2*a*, 2*b*, 2*c*, . . . in a scanning direction (in a direction B) in two lines at a constant pitch PL in the close-packed state. The lens array 2 comprises a refractive-index-distribution-type rod lens array, and focuses light beams emitted from the LED array 1 onto the surface of a photosensitive member (photosensitive drum) 4, serving as a recording medium, to form an image on the surface of the photosensitive member 4. In this embodiment, the lens array 2 is also named a "two-line lens array".

In FIG. 4, measuring means 3 comprises, for example, a photosensor, and measures nonuniformity in efficiency when the amount of emission (emission pattern) of the light beams emitted from the LED's is transmitted to the photosensitive member 4 by performing scanning while shifting the two-line lens array, formed by arranging the condensing lenses in two lines in a scanning direction (a main scanning direction) in the close-packed state, in the sub-scanning direction (in a direction A shown in FIG. 4). In the embodiment, an output signal obtained by the photosensor 3 is stored in a memory 6, data from the memory 6 is subjected to frequency decomposition processing, such as FFT (fast Fourier transform) or the like, and the processed data is displayed on a display 5, serving as output means, to confirm and control nonuniformity in the spatial frequency.

An object of this embodiment is that, by using a two-line lens array in which nonuniformity in the amount of light depending on the spatial frequency to influence the picture quality is hardly generated even if alignment between the LED array 1 and the two-line lens array 2 deviates in the sub-scanning direction, an image forming apparatus suitable for a printer head, a dot-array printer or the like, in which a high-quality image can be obtained although the adjustment of the alignment in the sub-scanning direction is easy or unnecessary.

For that purpose, a set value for the lens, in which the spatial frequency f hardly shifts to the low frequency side even if the alignment deviates in the sub-scanning direction, by suppressing the generation of nonuniformity at a low spatial frequency $f_L$ that is easily observable by the human eye, and replacing nonuniformity at the low spatial frequency by nonuniformity at a high spatical frequency $f_H$ that is hardly observable by the human eyes, may be obtained.

Accordingly, in this embodiment, as shown in FIG. 4, nonuniformity in the efficiency of transmission of light beams from light-emitting points (light-emitting diodes) of the LED array 1, in which the plurality of light-emitting diodes are arranged in a one-dimensional direction, to the photosensitive member via the two-line lens array 2 is measured by the photosensor 3 disposed at the photosensitive member 4 side by performing scanning while shifting the lens array 2 in the sub-scanning direction. The measured nonuniformity in the transmission efficiency is acquired as data, and the data is subjected to frequency decomposition processing by FFT. The processed data is output to the display, to recognize and control nonuniformity in the spatical frequency f.

More specifically, when the diameter of each condensing lens constituting the two-line lens array 2 is represented by D, nonuniformity in the amount of light is generated in the two-line lens array 2, formed by arranging the condensing lenses in two lines in the close-packed state, in the vicinity of spatial frequencies of f=n/D (n=1, 2, . . . ) due to the periodicity of the lenses, when performing FFT for the output of the photosensor 3. At that time, the solution for suppressing the generation of nonuniformity at a low spatical frequency $f_L$ even if alignment between the LED array 1 and the two-line lens array 2 deviates in the sub-scanning direction depends on the following parameter called a degree of overlap m.

In this embodiment, when, in FIG. 5, the radius of a field of view of a single condensing lens constituting the two-line lens array 2 is represented by $X_0$ (1.15 mm), the diameter of the condensing lens is represented by D (0.6 mm), and the degree of overlap is represented by $m=X_0/D$, the two-line lens array 2 is formed so as to satisfy the following condition:

$$1.85<m<2.00 \quad (1).$$

The condition (1) relates to the degree of overlap of the two-line lens array 2. If the value m is not within the condition (1), when the alignment deviates in the sub-scanning direction, nonuniformity tends to occur at a low spatial frequency $f_L$. As a result, the adjustment of the alignment becomes difficult, thereby causing a problem.

In this embodiment, by setting the value of the degree of overlap to an optimum value so as to satisfy the condition (1), in a region where the power of nonuniformity at the lowest spatial frequency f=1/D is smaller than the power of nonuniformity at spatical frequencies near the second lowest spatial frequency f=2/D, it is possible to suppress the occurrence of nonuniformity easily observable by the human eye even if alignment between the LED array 1 and the two-line lens array 2 deviates in the sub-scanning direction by a predetermined amount. As a result, the adjustment of the two-line lens array 2 with respect to the LED array 1 becomes very easy or unnecessary. The predetermined amount is an amount of deviation of the alignment in the sub-scanning direction of ±D/5. Nonuniformity in the spatical frequency f can be obtained by calculating the sum of the ratios of transmission of emission data at one point in respective lenses. The power may be obtained by performing FFT of the obtained value.

Lens arrays obtained by arranging condensing lenses (rod lenses) having an index distribution in a scanning direction (main scanning direction) in two lines in the close-packed state are widely known as lens arrays frequently used in image forming apparatuses, such as dot-array printers, printer heads and the like. If lenses are arranged in one line, nonuniformity in the amount of amplitude is large, so that it is difficult to suppress nonuniformity in the amount of amplitude to a value less than 5% which is considered to be sufficient for obtaining a high-quality image. If lenses are arranged in three lines or more, the cost greatly increases. In addition, the width of the array increases, resulting, for example, in an increase in the size of the printer head.

Accordingly, in this embodiment, by using a two-line lens array satisfying the above-described condition (1), a high-quality image is obtained without increasing the size of the entire apparatus. In order to provide a large amount of light, it is possible to select an optimum solution based on the embodiment.

Figure 6A:
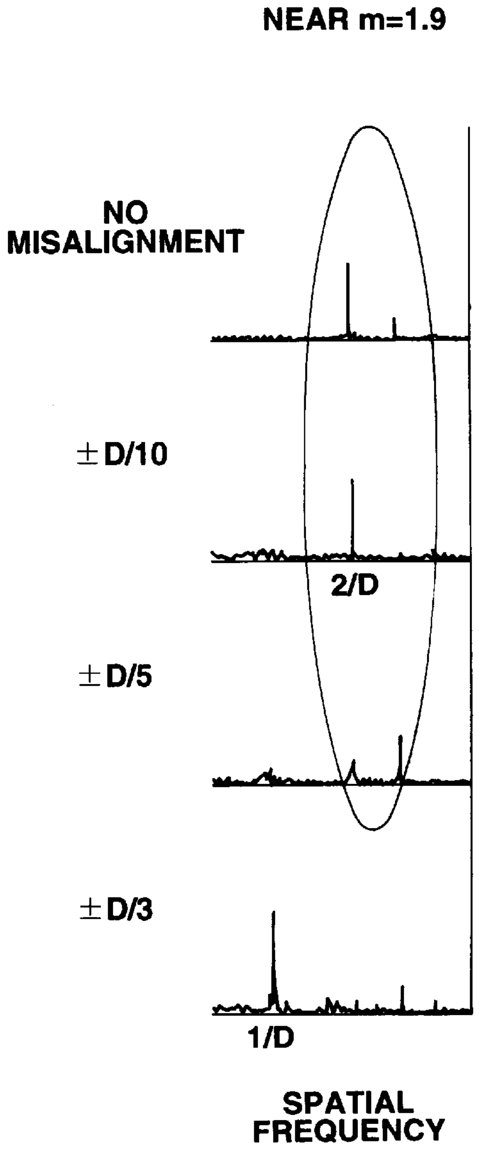
FIGS. 6(A) and 6(B) are diagrams for comparing the results of actual measurements using a two-line lens array of the invention and a two-line lens array of a comparative example.
Figure 6B:
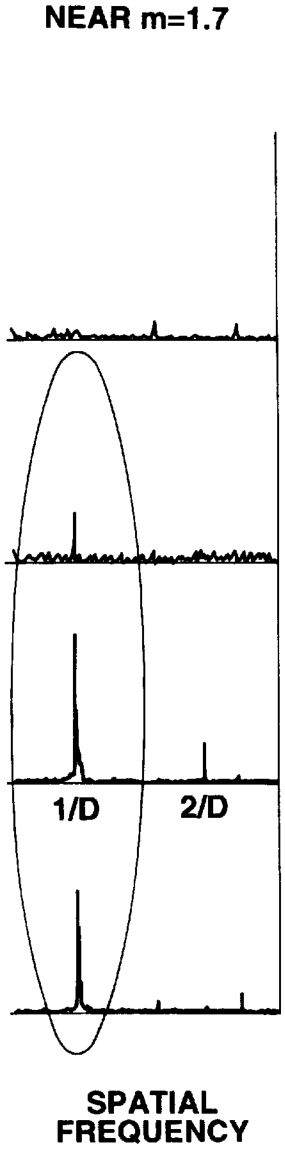

FIGS. 6(A) and 6(B) are graphs each illustrating the result of actual measurement using a two-line lens array. FIG. 6(A) is a graph illustrating a measured value when using a two-line lens array with a degree of overlap m of about 1.9 in the embodiment. FIG. 6(B) is a graph for comparison illustrating a measured value when using a two-line lens array with a degree of overlap m of about 1.7($X_0$=1.02 mm, and D=0.6 mm) where nonuniformity is small. In each of FIGS. 6(A) and 6(B), the case of no misalignment in the sub-scanning direction, and the cases of deviation in the alignment of ±D/10, ±D/5, and ±D/3 in the sub-scanning direction are shown in a sequence starting from the uppermost graph.

In the two-line lens array with the degree of overlap m of about 1.7 in the comparative example, while nonuniformity on the axis is very small over the entire spatial frequency band, nonuniformity due to the rod pitch which is easily observable is generated in the spatial frequency band of 1/D and abruptly increases as deviation in the alignment increases.

On the other hand, in the two-line lens array with the degree of overlap m of about 1.9 in the embodiment, since nonuniformity is generated in the spatial frequency band of 2/D where nonuniformity is hardly observable on the axis, one may consider that the lens array of the embodiment is inferior to the lens array of the comparative example. However, nonuniformity in the frequency band of 2/D causes no pratical problem, although nonuniformity in the frequency band of 1/D causes a problem.

In the embodiment, nonuniformity hardly moves to a spatial frequency band where nonuniformity is easily observable, even if the alignment deviates in the sub-scanning direction. As a result, even if the amount of deviation is about ±D/5 in the sub-scanning direction, no practical problem arises. At that time, if the power of nonuniformity at the lowest spatical frequency f=1/D is equal to or less than 5% and equal to or more than 0% of the average amount of light converted to the amount of amplitude, no problem arises.

When converting the power of nonuniformity at the spatial frequency of f=1/D into the amount of amplitude, nonuniformity at the spatial frequency f=1/D is subjected to inverse FFT to be converted into data of the amount of amplitude ($MAX_{1/D}$–$MIN_{1/D}$). Thus, the amount of amplitude ($MAX_{1/D}$–$MIN_{1/D}$) corresponding to the nonuniformity at the spatical frequency f=1/D is obtained from the relationship between the maximum value $MAX_{1/D}$ and the minimum value $MIN_{1/D}$ of the data.

Similarly, nonuniformity at the entire spatial frequency region including f=1/D is subjected to inverse FFT to be converted into data of the amount of amplitude ($MAX_{1/D}$–$MIN_{1/D}$). The average amount of light is obtained from the relationship between the maximum value $MAX_{1/D}$ and the minimum value $MIN_{1/D}$ of the data.

If the amount of amplitude ($MAX_{1/D}$–$MIN_{1/D}$) obtained in the above-described manner is equal to or less than 5% of the average amount of light, no practical problem arises.

As described above, in this embodiment, by forming a lens array so as to satisfy the condition (1), it is possible to obtain a two-line lens array in which nonuniformity to influence the picture quality is hardly generated even if alignment between an LED array and the two-line lens array deviates in the sub-scanning direction by a predetermined amount. By using this two-line lens array in an image forming apparatus, such as a printer head, a dot-array printer or the like, it is possible to easily obtain a high-quality image although the adjustment of the alignment is easy or unnecessary.

Although in the embodiment, a two-line lens array is used as imaging means, a one-line lens array satisfying the condition (1) may also be used as imaging means, although nonuniformity in the amount of amplitude is slightly larger.

According to the present invention, it is possible to provide an image forming apparatus suitable for a printer head, a dot array printer or the like, in which, by using a high-quality lens array redundant in alignment in a sub-scanning direction so as to hardly generate nonuniformity in the amount of light depending on the spatical frequency to influence the picture quality even if alignment between an LED array and the lens array deviates in the sub-scanning direction by a predetermined amount, a high-quality image can be obtained although the adjustment of the alignment is easy or unnecessary.

The individual components shown in outline in the drawings are all well-known in the image forming apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the cotrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

light-source means in which a plurality of light-emitting devices are arranged in a one-dimensional direction;

a recording medium; and a lens array for focusing light beams emitted from said light-source means onto a surface of said recording medium, said lens array being formed by arranging a plurality of condensing lenses in a scanning direction in two lines so as to stagger and closely place lenses in one line on lenses on another line, wherein, when the radius of a field of view of a single condensing lens is represented by $X_0$, the diameter of the condensing lens is represented by D, and a degree of overlap is represented by $m=X_0/D$, said lens array is formed so as to satisfy the following condition:

$$1.85<m<2.00.$$

2. An image forming apparatus according to claim 1, wherein said lens array comprises a refractive-index-distribution-type rod lens array.

3. An image forming apparatus according to claim 1, wherein said light-source means comprises a light-emitting-diode array.

4. A image forming apparatus comprising:

light-source means in which a plurality of light-emitting devices are arranged in a one-dimensional direction;

a recording medium; and a lens array for focusing light beams emitted from said light-source means onto a surface of said recording medium, said lens array being formed by arranging a plurality of condensing lenses in a scanning direction in two liens so as to stagger and closely place lenses in one line on lenses on another line, wherein, when nonuniformity in efficiency when an amount of emission of light beams emitted from the plurality of light-emitting devices is transmitted to said recording medium is measured by performing scanning while shifting said lens array in a sub-scanning direction and is acquired as data, and nonuniformity in a spatial frequency f appearing when the acquired data is subjected to frequency decomposition is generated at $f=n/D$ ($n=1, 2, \ldots,$ and D is the diameter of the condensing lens), said lens array is formed so that a power of nonuniformity at the lowest spatial frequency $f=1/D$ is smaller than a power of nonuniformity at spatial frequencies near the second lowest spatial frequency $f=2/D$ even if alignment between said light-source means and said lens array deviates in the sub-scanning direction by a predetermined amount.

5. An image forming apparatus according to claim 4, wherein the predetermined amount is $\pm D/5$.

6. An image forming apparatus according to claim 4, wherein the power of nonuniformity at the lowest spatial frequency $f=1/D$ is equal to or less than 5% and equal to or more than 0% of an average amount of light converted to an amount of amplitude.

7. An image forming apparatus according to claim 4, wherein, when the diameter of a field of view of a single condensing lens is represented by $X_0$, the diameter of the condensing lens is represented by D, and a degree of overlap is represented by $m=X_0/D$, said lens array is formed so as to satisfy the following condition:

$$1.85<m<2.00.$$

8. An image forming apparatus according to claim 4, wherein said lens array comprises a refractive-index-distribution-type rod lens array.

9. An image forming apparatus according to claim 4, wherein said light-source means comprises a light-emitting-diode array.

10. An image forming apparatus comprising:

light-source means in which a plurality of light-emitting devices are arranged in a one-dimensional direction;

a recording medium; and a lens array for focusing light beams emitted from said light-source means onto a surface of said recording medium, said lens array being formed by disposing a plurality of condensing lenses in a one-dimensional direction, wherein, when the diameter of a field of view of a single condensing lens is represented by $X_0$, the diameter of the condensing lens is represented by D, and a degree of overlap is represented by $m=X_0/D$, said lens array is formed so as to satisfy the following condition:

$$1.85<m<2.00.$$

11. An image forming apparatus according to claim 10, wherein said lens array comprises a refractive-index-distribution-type rod lens array.

12. An image forming apparatus according to claim 10, wherein said light-source comprises a light-emitting-diode array.

13. A printer head apparatus comprising:

light-source means in which a plurality of light-emitting devices are arranged in a one-dimensional direction; and a lens array for focusing light beams emitted from said light-source means onto a predetermined surface, said lens array being formed by arranging a plurality of condensing lenses in a scanning direction in two lines so as to stagger and closely place lenses in one line on lenses on the other line, wherein, when the radius of a field of view of a single condensing lens is represented by Xo, the diameter of the condensing lens is represented by D, and a degree of overlap is represented by m=Xo/D, said lens array is formed so as to satisfy the following condition:

$$1.85<m<2.00.$$

14. A printer head apparatus according to claim 13, wherein said lens array comprises a refractive-index-distribution-type rod lens array.

15. A printer head apparatus according to claim 13, wherein said light-source means comprises a light-emitting-diode array.

16. A image forming apparatus comprising:

light-source means in which a plurality of light-emitting devices are arranged in a one-dimensional direction; and a lens array for focusing light beams emitted from said light-source means onto a predetermined surface, said lens array being formed by arranging a plurality of condensing lenses in a scanning direction in two lines so as to stagger and closely place lenses in one line on lenses on two other lines, wherein, when nonuniformity in efficiency when any amount of emission of light beams emitted from the plurality of light-emitting devices is transmitted to said recording medium is measured by performing scanning while shifting said lens array in a sub-scanning direction and is acquired as data, and nonuniformity in a spatial frequency f appearing when the acquired data is subjected to frequency decomposition is generated at f=n/D (n=1, 2, . . . , and D is the diameter of the condensing lens), said lens array is formed so that a power of nonuniformity at the lowest spatial frequency f=1/D is smaller than a power of nonuniformity at spatial frequencies near the second lowest spatial frequency f=2/D even if alignment between said light-source means and said lens array deviates in the sub-scanning direction by a predetermined amount.

17. A printer head apparatus according to claim 16, wherein the predetermined amount is ±D/5.

18. A printer head apparatus according to claim 16, wherein the power of nonuniformity at the lowest spatial frequency f=1/D is equal to or less than 5% and equal to or more than 0% of an average amount of light converted to an amount of amplitude.

19. A printer head apparatus according to claim 16, wherein, when the diameter of a field of view of a single condensing lens is represented by Xo, the diameter of the condensing lens is represented by D, and a degree of overlap is represented by m=Xo/D, said lens array is formed so as to satisfy the following condition:

$$1.85<m<2.00.$$

20. A printer head apparatus according to claim 16, wherein said lens array comprises a refractive-index-distribution-type rod lens array.

21. A printer head apparatus according to claim 16, wherein said light-source means comprises a light-emitting-diode array.

22. A printer head apparatus comprising:

light-source means in which a plurality of light-emitting devices are arranged in a one-dimensional direction; and a lens array for focusing light beams emitted from said light-source means onto a predetermined surface, said lens array being formed by disposing a plurality of condensing lenses in a one-dimensional direction, wherein, when the diameter of a field of view of a single condensing lens is represented by Xo, the diameter of the condensing lens is represented by D, and a degree of overlap is represented by m=Xo/D, said lens array is formed so as to satisfy the following condition:

$$1.85<m<2.00.$$

23. A printer head apparatus according to claim 22, wherein said lens array comprises a refractive-index-distribution-type rod lens array.

24. A printer head apparatus according to claim 22, wherein said light-source comprises a light-emitting-diode array.

* * * * *

UNITED STATES PATENT AND TRADEMARK OFFICE

CERTIFICATE OF CORRECTION

PATENT NO. : 6,088,164

DATED : July 11, 2000

INVENTOR(S) : MOTOMU FUKASAWA

It is certified that error appears in the above-identified patent and that said Letters Patent is hereby corrected as shown below:

COLUMN 1
Line 15, "an" should read --a--.

COLUMN 2
Line 37, "staggerly" should read --stagger--.

COLUMN 3
Line 59, "deposed" should read --disposed--.

COLUMN 4
Line 36, "eyes," should read --eye,--.

COLUMN 7
Line 4, "cotrary," should read --contrary,--;

UNITED STATES PATENT AND TRADEMARK OFFICE

CERTIFICATE OF CORRECTION

PATENT NO. : 6,088,164

DATED : July 11, 2000

INVENTOR(S) : MOTOMU FUKASAWA

It is certified that error appears in the above-identified patent and that said Letters Patent is hereby corrected as shown below:

COLUMN 7, Cont'd.
Line 36, "A" should read --An--; and
Line 44, "liens" should read --lines--.

COLUMN 8
Line 64, "A image forming" should read --A printer head--.

Signed and Sealed this

Twenty-fourth Day of April, 2001

Attest:

Nicholas P. Godici

NICHOLAS P. GODICI

Attesting Officer

*Acting Director of the United States Patent and Trademark Office*